Aug. 7, 1923.
F. M. FISH
LOCK
Filed Sept. 10, 1921
1,464,262
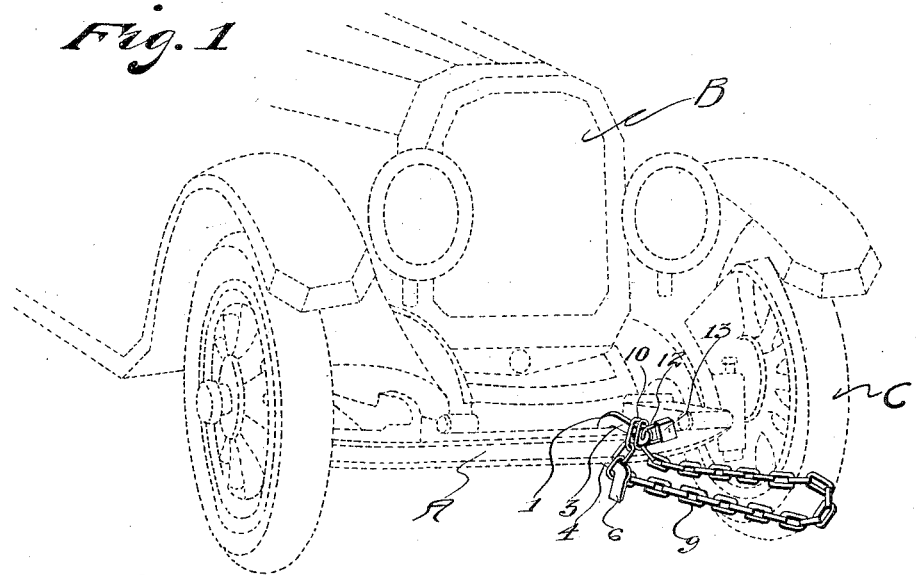
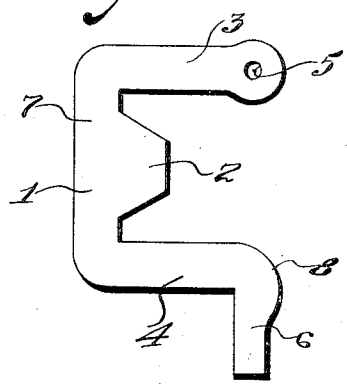
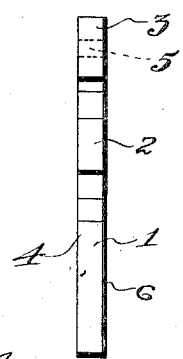
Frank M. Fish
INVENTOR
BY Victor J. Evans
ATTORNEY Patented Aug. 7, 1923.

1,464,262

UNITED STATES PATENT OFFICE.

FRANK M. FISH, OF BELOIT, WISCONSIN.

LOCK.

Application filed September 10, 1921. Serial No. 499,692.

*To all whom it may concern:*

Be it known that I, FRANK M. FISH, a citizen of the United States, residing at Beloit, in the county of Rock and State of Wisconsin, have invented new and useful Improvements in Locks, of which the following is a specification.

This invention relates to locks particularly designed for use on motor vehicles, and an object of the invention is to provide a motor vehicle lock which operates in combination with the front axle or frame of a motor vehicle and one of its wheels or a permanent support, whereby it will be practically impossible to move the motor vehicle while the lock is in locked position, except at times when the lock is arranged to permit limited movement of the vehicle in either direction.

Another object of this invention is to provide a lock structure as specified which comprises an axle engaging member to which a flexible member, such as a chain or wire cable, is detachably connected and locked, and which chain or cable may be utilized as a towing rope when necessary.

A further object of this invention is to provide a lock for motor vehicles as specified which may be cheaply manufactured and one which will not require any alterations whatsoever to the motor vehicle upon which it is used.

Other objects of the invention will appear in the following detailed description and in the accompanying drawing wherein—

Fig. 1 is a perspective view of the improved lock showing it applied.

Fig. 2 is a plan view of the axle engaging member of the lock.

Fig. 3 is an edge elevation of the axle engaging member of the lock.

Fig. 4 is a plan of the towing rope used in connection with the lock.

Fig. 5 is a view of the towing rope from a different point than that shown in Fig. 4.

Referring more particularly to the drawing the improved lock comprises an axle engaging member 1 which is formed of metal, in a substantially U shape having a frusto triangular extension 2 projecting inwardly between its upper and lower arms 3 and 4 as clearly shown in Fig. 2 of the drawing. The frusto triangular projection 2 is provided for engaging in the channel of the front axle A or frame of a motor vehicle as indicated at B while the arms 3 and 4 engage across the top and bottom of the axle or frame respectively as clearly shown in Fig. 1 of the drawing. The arm 3 is provided with a lock hasp receiving opening 5 and a projection 6 is formed upon the free end of the arm 4, extending outwardly therefrom and substantially in parallel relation to the bight portion 7 of the member 1. The outer edge of the extension 6 and arm 4 and their junction is rounded as shown at 8 to permit the links of a chain 9 to be slipped thereover.

When a chain, as shown at 9, is used in connection with the locking member 1 the third link from one end of the chain is passed upwardly over the extension 6 on to the arm 4 and engagement with the axle A, after which the chain is passed about one of the front or rear wheels or both, of the motor vehicle B and returned to the locking member 1 having its outer end link mounted over the arm 3, after which the hasp 12 of any approved type of padlock 13 is inserted through the opening 5 which securely locks the ends of the chain 9 on the arm 3 and locks the chain about the front wheel C or rear wheel or both preventing rotation of the wheel or wheels and consequently preventing movement of the vehicle while the lock is applied. May also be anchored to a post, tree or other anchor by using a longer chain.

By making the chain 9 of strong material and providing a strong pin-tumbler type of padlock 13 a strong and positive lock for the vehicle may be provided which will require considerable work to cut the chain or padlock and consequently will practically eliminate malicious tampering with or theft of the motor vehicle.

In Fig. 4 of the drawing a wire rope or cable 20 is shown which has relatively short chains 21 and 22 connected to its ends by means of loops or eyes 23 formed on the wire rope. The links of the chains 21 and 22 are provided for connection with the member 1 in the same manner in which the links of the chains are associated therewith and to permit such connection the chain 21 is provided with three or more links so as to allow it to properly engage both the arms 3 and 4. The wire rope or cable 20 when used for locking the vehicle, may be passed about one or more of the wheels of the vehicle, or about a telephone post, tree, or other permanent support for securely locking and anchoring the motor vehicle. The wire rope or cable 20 is also adapted for use as a towing rope when necessary and it will, therefore, be seen that by providing the wire cable or rope 20, the motorist will have both a lock and towing rope convenient for use when either is desired.

It is of course, to be understood that the invention may be constructed in various other manners and the parts associated in different relations and, therefore, I do not desire to be limited in any manner except as set forth in the claims hereunto appended.

Having thus described my invention what I claim is:

1. In a motor vehicle lock, an axle or frame engaging member comprising spaced arms, a flexible anchoring member having links adapted to engage over said arms, a lock for connection with one of said arms to prevent disconnection of the axle engaging member and flexible member, said axle engaging member provided with a projection between said arms for engagement in the channel of a vehicle axle or frame.

2. In a motor vehicle lock, an axle or frame engaging member comprising spaced arms, a flexible anchoring member having links adapted to engage over said arms, a lock for connection with one of said arms to prevent disconnection of the axle or frame engaging member and flexible member, said axle or frame engaging member provided with a projection between said arms for engagement in the channel of a vehicle axle or frame, a transverse extension on one of said arms and projecting outwardly therefrom for preventing disconnection of said flexible member and the arm upon which the extension is formed.

In testimony whereof I affix my signature.

FRANK M. FISH.